United States Patent [19]

Kim

[11] Patent Number: 4,766,493

[45] Date of Patent: Aug. 23, 1988

[54] DEVICE FOR VERIFYING OPERATIONAL CONDITIONS OF MONITOR

[75] Inventor: Woo J. Kim, Kumi, Rep. of Korea

[73] Assignee: Gold Star Co., Ltd., Seoul, Rep. of Korea

[21] Appl. No.: 46,583

[22] Filed: May 6, 1987

[30] Foreign Application Priority Data

May 6, 1986 [KR] Rep. of Korea ............ 6277

[51] Int. Cl.$^4$ ............................................ H04N 17/04
[52] U.S. Cl. ..................................... 358/139; 340/715
[58] Field of Search .................. 358/139, 10; 324/404, 324/121 R; 340/715, 814, 309.6

[56] References Cited

U.S. PATENT DOCUMENTS 3,548,403 12/1970 Johnson ............................ 340/811
4,536,792 8/1985 Harshbarger ..................... 358/139
4,568,975 2/1986 Harshbarger ..................... 358/139
4,703,319 10/1987 Schine ............................... 340/715

Primary Examiner—Howard W. Britton
Attorney, Agent, or Firm—Birch, Stewart, Kolasch & Birch

[57] ABSTRACT

A device for verifying the operational conditions of a monitor, to distinguish between a computer malfunction and a monitor malfunction by separating the signal cable of the monitor from the computer in the event that the computer system gets out of order. The horizontal synchronizing signal input terminal is connected to the base of a transistor, the collector of which is connected to the base of a switching transistor through a rectifying diode and smoothing condenser, the collector of the switching transistor is connected to a power supply terminal and to the base of an amplifying transistor for amplification of the video signals, so that when the horizontal synchronizing signals are input, the switching transistor is in an on-state so as not to affect the amplifying transistor, while in the case where horizontal synchronizing signals are not input, the switching transistor is turned off so that a power source at the power supply terminal turns on the amplifying transistor to test the operation of the display tube.

3 Claims, 1 Drawing Sheet

DEVICE FOR VERIFYING OPERATIONAL CONDITIONS OF MONITOR

BACKGROUND OF THE INVENTION

The present invention relates to a device for verifying the operational conditions of a monitor, designed to distinguish easily between a computer malfunction and a monitor malfunction by removing the signal cable of the monitor from a computer to which it is connected, in the event that the computer system gets out of order. In general, when a computer system error occurs, it is possible to distinguish between a computer malfunction and a monitor malfunction by applying a direct current voltage to the video signal input terminal of the monitor used in connection with the computer.

The conventional device for verifying the operational conditions of a monitor, as shown in FIG. 1, is formed, by way of example, by connecting the base of a transistor TR1 connected with a video signal imput terminal Vi to a power supply terminal B+ through a switch SW1 and a resistance R2. According to this conventional device, therefore, in the event that a display corresponding to the output of the computer is not shown on the monitor, the operational conditions of the monitor are verified by short-circuiting the switch SW1 mounted in an interior of the monitor and applying the electric potential source of the power supply terminal B+ to the base of transistor TR1 through the resistance R2 and switch SW1 so as to put out a low-potential signal, the video signal output terminal Vo of which is the collector of the transistor TR1. Therefore, if no abnormality exists in the deflection circuit, power supply circuit and video circuit, bright video signals are shown on the Braun tube of the monitor by the low-potential signals appearing on the said video signal output terminal Vo, by which a normal condition of a monitor is verified and the computer malfunction is determined. On the contrary, if bright video signals are not shown on the Braun tube of the monitor, a monitor malfunction is diagnosed.

However, with such a conventional device, when the computer system gets out of order, the switch mounted in the interior of the monitor is short-circuited only after disassembling the housing of the monitor in order to verify its operational conditions.

OBJECTS OF THE INVENTION

The present invention is devised taking such problems into consideration, and the object of the invention is to provide a device for verifying a operational conditions of the monitor, to determine whether the monitor operates normally or not, by disconnecting the signal cable of the monitor connected to the computer without short-circuiting the switch in the interior of the monitor, in the event that the computer system gets out of order.

According to the invention, such object is attained in that the horizontal synchronizing signal input terminal is connected to the base of a transistor, the collector of which is connected to the base of the switching transistor through a rectifying diode and smoothing condenser, a collector of the switching transistor is connected to the power supply terminal and at an same time to the base of the amplifying transistor of the video signals together with the video signal input terminal, so that in a state in which horizontal synchronizing signals are input, the switching transistor is maintained in an on-state, and thereby has no effect on the transistor for amplification of the video signals, while in a state in which the horizontal synchronizing signals are not input, the switching transistor is off and thereby the transistor for amplification of the video signals is turned on by the power source of the power supply terminal.

BRIEF DESCRIPTION OF THE DRAWINGS

Embodiments and operational examples of the invention will now be described in more detail with reference to the accompanying drawings. In the drawings.

BEST MODE OF CARRYING OUT THE INVENTION

Figure 1:
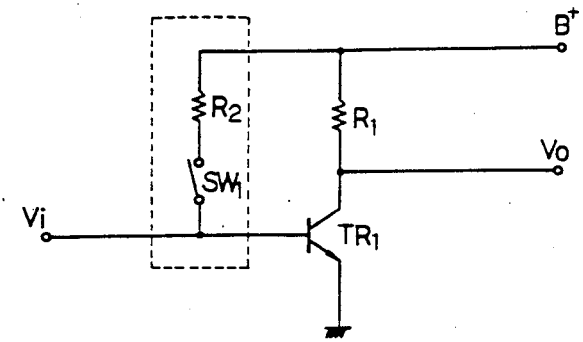
FIG. 1 is a circuit diagram of the conventional device for verifying a operational conditions of the monitor.
Figure 2:
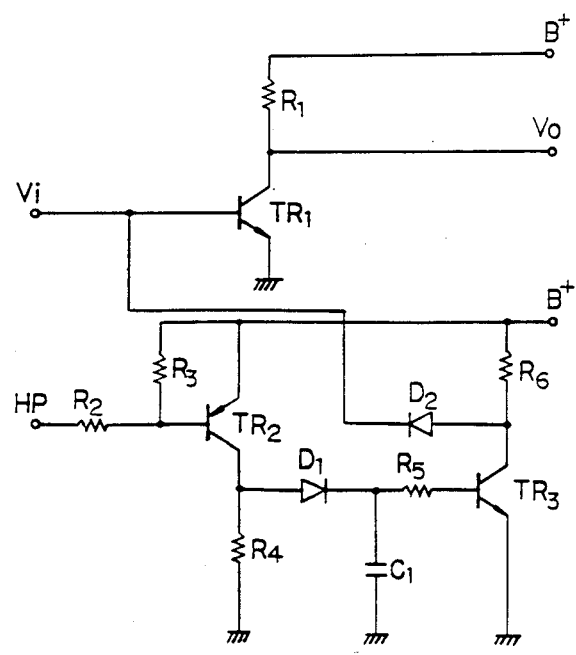
FIG. 2 is a circuit diagram of a device of verifying the operational conditions of the monitor according to the present invention.

As is shown in FIG. 2, the monitor for amplifying video signals input to the video signal input terminal Vi through the transistor TR1 and outputting them to the video signal output terminal Vo, is formed by connecting the horizontal synchronizing signal input terminal HP to a base of the transistor TR2 through a resistance R2; connecting the collector of TR2 to ground via resistance R4; connecting the junction point of the transistor and resistance to the smoothing condenser C1 through a rectifying diode D1 and to a base of the switching transistor TR3 through a resistance R5; connecting the collector of the switching transistor TR3 to a power supply terminal B+ through a resistance R6 and connecting the collector of the transistor TR3 to the base of the transistor TR1 through a diode D2.

According the thus formed invention, when the computer system state is in a normal system, the horizontal synchronizing signals are input to the horizontal synchronizing input terminal HP, and the video signals are input to the video signal input terminal Vi. Accordingly, the horizontal synchronizing signals input to the horizontal synchronizing input terminal HP are subject to phase inversion in the transistor TR2 and output at to the collector of the transistor TR2, the output signals being converted into a direct current voltage after being rectified by the diode D1 and then smoothed by the condenser C1, this direct current voltage turning on the resistance TR3 through the transistor R5 so as to put out a low-potential signal at the collector of the transistor TR3.

In consequence, the diode D2 is in an off-state and does not have any effect on the base of the transistor TR1.

Accordingly, the video signals input to the video signal input terminal Vi are amplified in the transistor TR1 and output to the video signal output terminal Vo so that normal pictures corresponding to the output video signals of the computer are shown on the Braun tube of the monitor.

However, if it is sensed that the computer system is in an abnormal state, and the monitor signal cable of the monitor connected to the computer is pulled out, both the video signal input terminal Vi and the horizontal synchronizing signal output terminal HP are disconnected. Accordingly, the transistor TR2 is turned off and its collector has no output voltage, so that the charging voltage of the condenser C1 is discharged through the resistance R5. Thus, when the charging voltage of the condenser C1 is discharged below the operation voltage of the switching transistor TR3, the transistor TR3 turns off, and accordingly the power source at the power supply terminal B+ is applied to the base of the transistor TR1 through the resistance R6 and the diode D2 and the transistor TR1 is turned on thereby outputting a low potential signal to the video signal output terminal Vo. At this moment, if there is no abnormality in the power supply circuit, deflection circuit or video circuit, a bright picture is shown on the Braun tube of the monitor, so that it is possible to determine that the monitor is in a normal state, while the computer is in a state of malfunction. On the contrary, if a bright picture is not shown on the Braun tube of the monitor, it is determined that the monitor is in an abnormal state.

As described above, the invention has the advantage that in that, it is possible to distinguish between a malfunction on the side of the computer and a malfunction on the side of the monitor by simply separating the signal cable of the monitor from the computer, resulting in convenience to the user.

What is claimed is:

1. A device for determining the operational conditions of a display monitor, comprising:
    amplifying means for amplifying input display signals and outputting amplified display signals;
    display means for displaying said amplified display signals; and
    switching means, responsive to input display synchronizing signals, for applying a test display signal to said amplifying means upon the absence of said display synchronizing signals.

2. The device defined in claim 1, wherein said amplifying means comprises a first transistor having input display signals applied to a base terminal thereof and outputting amplified display signals at a collector terminal thereof.

3. The device defined in claim 2, wherein said switching means comprises a second transistor coupled to receive said display synchronizing signals and outputting said synchronizing signals, rectifier means for rectifying said output synchronizing signals, and a third transistor coupled to receive the rectified synchronizing signals at a base terminal thereof, said thrid transistor grounding said test display signal in an ON state when receiving said rectified signals, and allowing said test display signal to be applied to said amplifying means in an OFF state when not receiving said rectified signals.

* * * * *